Patented Sept. 14, 1954

2,689,263

UNITED STATES PATENT OFFICE 2,689,263

PREPARATION OF HYDROXYALKYL AMINES

Claude J. Schmidle, Moorestown, N. J., and Gerard C. Riley, Philadelphia, Pa., assignors to Rohm & Haas Company, Philadelphia, Pa., a corporation of Delaware No Drawing. Application April 25, 1952, Serial No. 284,454

5 Claims. (Cl. 260—584)

The invention deals with a process for preparing N-hydroxyalkyl amines by reacting a primary or secondary amine with an epoxide in the presence of a strongly acidic cation-exchange resin.

The addition reaction of an epoxide such as ethylene oxide or propylene oxide and a water-soluble amine having hydrogen on the nitrogen atom thereof occurs fairly readily. As the molecular size of a said amine increases, however, the reaction becomes slower. With amines having an N-substituent of about eight or more carbon atoms it becomes necessary to resort to some expedient to promote the reaction.

Apparently the desired reaction takes place in the presence of ammonium ions which are formed by combination of amine and water or amine and an acid. But if acid is used, steps must be taken to separate salt, amine, and product and the acid is used up or lost.

We have discovered that the reaction of epoxides and amines having reactive hydrogen on the nitrogen thereof is advantageously effected at temperatures between about 50° C. and 150° C. and with 1,2-alkylene oxides of not over four carbon atoms, preferably between 59° C. and 70° C., by bringing these reactants together in the presence of a sulfonated cation-exchange resin in its hydrogen form. The reaction may be performed in the presence of an inert organic solvent. It is much facilitated by the presence of water in the reaction mixture. Sufficient water is usually retained in the resin after it has been converted to its acid form with an aqueous acid solution and washed with water.

As an epoxide there may be reacted ethylene oxide, propylene oxide, butylene oxide, butadiene monoxide, styrene oxide, and like oxiranes. The 1,2-alkylene oxides form a valuable subclass of reactants.

As useful amines there may be used aliphatic amines, RR'NH, where R is an aliphatic hydrocarbon group, particularly a hydrocarbon group of eight to eighteen carbon atoms, when the process of this invention is most advantageous, and R' is hydrogen or the methyl group. When the aliphatic hydrocarbon group R is such an alkyl group as octyl, nonyl, decyl, dodecyl, tetradecyl, pentadecyl, or octadecyl, or the like in their various isomeric forms, the process is peculiarly advantageous. R may also be an unsaturated aliphatic group, such as undecenyl, dodecenyl, or octadecenyl. Furthermore, the process is of greatest value when the amino nitrogen is attached to a tertiary carbon atom of the aliphatic hydrocarbon group. Typical useful amines include the various octylamines, nonylamines, decylamines, dodecylamines, or octadecylamines, nonylmethylamine, dodecylmethylamine, methyloctadecylamine, and the like. But the reaction is not limited thereto, although with these amines the process of this invention is peculiarly advantageous. The process may also be used to promote reaction between oxiranes and other amines carrying hydrogen on the amino nitrogen. It can be desirably applied to the hydroxyalkylation of any water-insoluble aliphatic amine having at least one hydrogen on its amino nitrogen atom.

As strongly acidic cation-exchange resins, sulfonated cross-linked styrene resins and sulfonated phenol-formaldehyde resins are of chief importance. Resins of these types are well known and are commercially available. For purposes of this invention the resins are taken in their hydrogen form or, if they are obtained in a salt form, they are converted to the hydrogen form by treating with a solution of a strong acid and rinsing with water to remove free acid. The resin is conveniently used in a water-wet form. If a dry sulfonic acid resin should be the starting resin, it may be washed with water or water may be added to the reaction mixture. A water content of 10% to 40% in the resin is useful in providing good catalytic action, but the percentage of water is not critical.

The reaction is carried out by bringing together reactive amine, epoxide, and sulfonic cation exchanger in its hydrogen form. Amine and exchanger may be mixed and epoxide is then run into the mixture. Again, both amine and epoxide may be passed through a bed of exchanger. Other convenient procedures may be followed for bringing together these materials. The reaction products may often be distilled. In some cases they are best collected as residues after they have been stripped of reactants.

Typical preparations are disclosed in the following illustrative examples. Parts are by weight.

*Example 1*

Butadiene monoxide in an amount of 40 parts is added dropwise in a closed system to a stirred mixture of 100 parts of tert.dodecylamine and 45 parts of acidic sulfonated styrene-divinylbenzene copolymer carrying about 40% of water. The time of addition is about two hours, during which time the temperature of the mixture is kept at 80°–85° C. The mixture is filtered and the filtrate is distilled. After recovery of unreacted amine there is obtained a fraction of 35 parts distilling at 155°–175° C./19 mm. This corresponds in composition to 2-tert.-dodecylamino-3-butenol or N-(1-hydroxy-3-buten-2-yl)-N-tert.-dodecylamine,

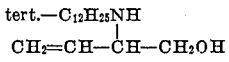

Example 2

There are mixed 154 parts of tert.-dodecylamine, 108 parts of water, and 43 parts of a dry sulfonated cation-exchange resin in its hydrogen form, the resin being a sulfonated copolymer from 98 parts of styrene and 2 parts of divinylbenzene. This mixture is warmed to about 60° C. and ethylene oxide is passed into the vessel at about 12 inches of mercury pressure. During the course of 90 minutes about 40 parts of ethylene oxide are taken up. The resin is removed by filtration and the amine layer is stripped. The product thus obtained is chiefly N-hydroxyethyl-N-tert.-dodecylamine,

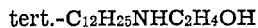

Example 3

In the same way there are mixed and reacted at 60°–70° C. 67 parts of tert.-octadecylamine and 11 parts of ethylene oxide in the presence of 40 parts of a sulfonic acid cation exchanger containing about 30% of water. The resin is removed by filtration and the filtrate is stripped by heating under reduced pressure to yield a residue which corresponds in composition to N-hydroxyethyl-tert.-octadecylamine.

Example 4

In the same way a mixture of 197 parts of methyldodecenylamine and 90 parts of acidic sulfonated styrene-divinylbenzene resin carrying about 40% of water is treated with ethylene oxide at about 60° C. until a total of 45 parts of the oxide is taken up. The resin is separated by filtration and the filtrate is stripped by heating under reduced pressure. The residue corresponds in composition to N-hydroxyethyl-N-methyldododecenylamine.

Ethylene oxide may be replaced with propylene oxide or a butylene oxide, the corresponding N-hydroxyalkyl derivatives being formed in the same way.

Example 5

In a similar way 140 parts of 3,5,5-trimethylhexylamine is mixed with 50 parts of a sulfonated phenol-formaldehyde cation-exchange resin in its hydrogen form, the resin being saturated with water. With the temperature of the mixture at 50°–60° C. ethylene oxide is passed in until 70 parts thereof have been taken up. The reaction mixture is filtered. The filtrate is subjected to fractional distillation. After a forerun at 66°–70° C./20 mm. a fraction of 62 parts is obtained at 85°–90° C./0.4–0.7 mm., which contains 7.6% of nitrogen, corresponding to N-hydroxyethylnonylamine, and a fraction of 70 parts at 110°–125° C./ca. 1 mm., corresponding to N,N-di(hydroxyethyl)nonylamine.

The process herein described is advantageous in that there may now be reacted even long-chained aliphatic amines without formation of acid salts and without the necessity of removing acid from such salts. It is desirably used with water-insoluble amines and is particularly desirable when applied to amines having aliphatic hydrocarbon groups of eight to eighteen carbon atoms. The resin can readily be separated from amine and reaction products, as by filtering. The process can readily be carried on in a continuous manner. The products are useful as corrosion inhibitors, oil additives, surface active agents, textile finishing agents, and chemical intermediates.

We claim:

1. The process of preparing N-hydroxyalkyl amines which comprises reacting between 50° C. and 150° C. a 1,2-alkylene oxide of not over four carbon atoms and an amine of the formula RR'NH, wherein R is an aliphatic hydrocarbon group of 8 to 18 carbon atoms and R' is a member of the class consisting of hydrogen and the methyl group, said reaction being effected in the presence of a sulfonated cation-exchange resin in its hydrogen form and in the presence of water.

2. The process of claim 1 wherein the water present is equal to 10% to 40% of the resin by weight.

3. The process of preparing N-hydroxyethyl amines which comprises reacting between 50° C. and 70° C. ethylene oxide and a primary alkylamine of eight to eighteen carbon atoms in the presence of a sulfonated cation-exchange resin in its hydrogen form and in the presence of water.

4. The process of claim 3 wherein the alkyl group of the amine has a tertiary carbon atom at the point of attachment to the amino nitrogen atom.

5. The process of preparing an N-(1-hydroxy-3-buten-2-yl) alkylamine which comprises reacting between 50° C. and 150° C. butadiene monoxide and a primary alkylamine of eight to eighteen carbon atoms in the presence of a sulfonated cation-exchange resin in its hydrogen form and in the presence of water.

References Cited in the file of this patent

UNITED STATES PATENTS

| Number | Name | Date |
|---|---|---|
| 2,541,678 | Swaney et al. | Feb. 13, 1951 |

OTHER REFERENCES

Nachod: "Ion Exchange," Academic Press, Inc., New York, 1949, pp. 265–272.